(12) United States Patent
Ish

(10) Patent No.: US 8,621,134 B2
(45) Date of Patent: Dec. 31, 2013

(54) STORAGE TIERING WITH MINIMAL USE OF DRAM MEMORY FOR HEADER OVERHEAD

(75) Inventor: Mark Ish, Norcross, GA (US)

(73) Assignee: LSI Corporation, San Jose, CA (US)

( * ) Notice: Subject to any disclaimer, the term of this patent is extended or adjusted under 35 U.S.C. 154(b) by 317 days.

(21) Appl. No.: 13/023,457

(22) Filed: Feb. 8, 2011

(65) Prior Publication Data

US 2012/0117297 A1    May 10, 2012

Related U.S. Application Data

(60) Provisional application No. 61/411,046, filed on Nov. 8, 2010.

(51) Int. Cl.
 *G06F 12/00* (2006.01)
(52) U.S. Cl.
 USPC ............. 711/4; 711/105; 711/151; 711/165; 711/202

(58) Field of Classification Search
 USPC ............. 711/4, 5, 105, 111, 151, 165, 202, 711/E12.001
 See application file for complete search history.

(56) References Cited

U.S. PATENT DOCUMENTS 7,184,944 B1    2/2007   Rieschl et al.
2010/0281230 A1*  11/2010   Rabii et al. .................... 711/165

* cited by examiner

*Primary Examiner* — Jasmine Song
(74) *Attorney, Agent, or Firm* — Christopher P. Whitham; Cochran Freund & Young LLC

(57) ABSTRACT

Disclosed is a method of storage tiering with minimal use of DRAM memory for header overhead that utilizes the beginning of the volume to store frequently accessed or hot data. A solid state storage device is placed at the beginning of a tiered volume and is used to store frequently accessed data. When data becomes less frequently accessed it is moved to a cold data storage area on a hard disk drive in the tiered volume. The data exchange is performed on a one-to-one basis reducing the amount and use of DRAM.

11 Claims, 5 Drawing Sheets

STORAGE TIERING WITH MINIMAL USE OF DRAM MEMORY FOR HEADER OVERHEAD

CROSS-REFERENCE TO RELATED APPLICATION

This application is based upon and claims priority to U.S. provisional application Ser. No. 61/411,046, filed Nov. 8, 2010, by Mark Ish, entitled "Storage Tiering with Minimal Use of DRAM Memory for Header Overhead." The entire content of this application is specifically incorporated herein by reference for all that it discloses and teaches.

BACKGROUND

The present invention relates generally to the field of logical block addressing and tiered data storage. Tiered storage is a data storage environment consisting of two or more types of storage, delineated by differences in at least one of the four following attributes: price, performance, capacity and function. Tiering solutions often contain fast and slow storage areas which are typically combined in a single storage volume. In order to improve performance, these solutions attempt to file frequently accessed data in fast storage areas, and infrequently accessed data in slow storage areas. Fast storage areas generally utilize solid state drives and other devices that have no moving parts, whereas slow storage areas are typically configured as traditional hard drives with moving parts.

SUMMARY

An embodiment of the present invention may therefore comprise a method of storage tiering with reduced use of dynamic random access memory for header overhead comprising: tiering a plurality of data storage devices into hot storage regions and cold storage regions; mapping hot storage regions and cold storage regions so that hot storage regions is positioned at a beginning portion of a volume; moving cold data to cold storage regions and hot data to hot storage regions on a one-to-one basis wherein infrequently accessed data in a hot storage region is moved to a cold storage region and frequently accessed data in a cold storage region is moved to a hot storage region.

The method of claim 1 wherein a process of swapping cold data and hot data on a one-to-one basis comprises: reading cold data from a logical block address on hard disk drive; reading hot data from a logical block address on solid state drive; swapping cold data from a logical block address on a hard disk drive with hot data from a logical block address on a solid state drive.

A method of minimizing the use of dynamic random access memory that is used in a tiered drive storage system to provide logical block addresses for frequently accessed data comprising: dividing a solid state logical volume into equal divisions; assigning header tracks for mapping said logical block addresses; based upon a determination that said header tracks of equal divisions, assigning an identification of a member logical volume, starting logical block address of equal divisions for hot storage region, starting logical block address of equal divisions for cold storage regions.

The method of claim 3 further comprising: moving and storing frequently accessed data in a hot storage region, moving and storing infrequently accessed data in a cold storage region, based on a determination that frequently accessed data becomes infrequently accessed, swapping frequently accessed data with infrequently accessed data in a one-to-one exchange.

The method of claim 4 further comprising hashing incoming data and directing frequently accessed data a hot data storage area.

A system of tiered storage devices comprising; solid state drives that have hot storage regions that are divided into equal divisions with assigned header tracks for mapping logical addresses; hard disk drives that have cold storage regions that are divided into equal divisions with assigned header tracks for mapping logical addresses; dynamic random access memory that stores logical block addresses of hot storage regions and cold storage regions; a processor that moves infrequently accessed data in a hot storage region, upon accessing data, to a cold storage region and moving frequently accessed data in a cold storage region to a hot storage region.

The system of claim 6 further wherein solid state drives and hard disk drives are operatively coupled together in a tiered storage system.

The system of claim 6 wherein a processor further comprises a processor that performs a one-to-one mapping of data between a hot storage region to a cold storage region by swapping data between a hot storage region and a cold storage region.

DETAILED DESCRIPTION OF THE EMBODIMENTS

Figure 1:
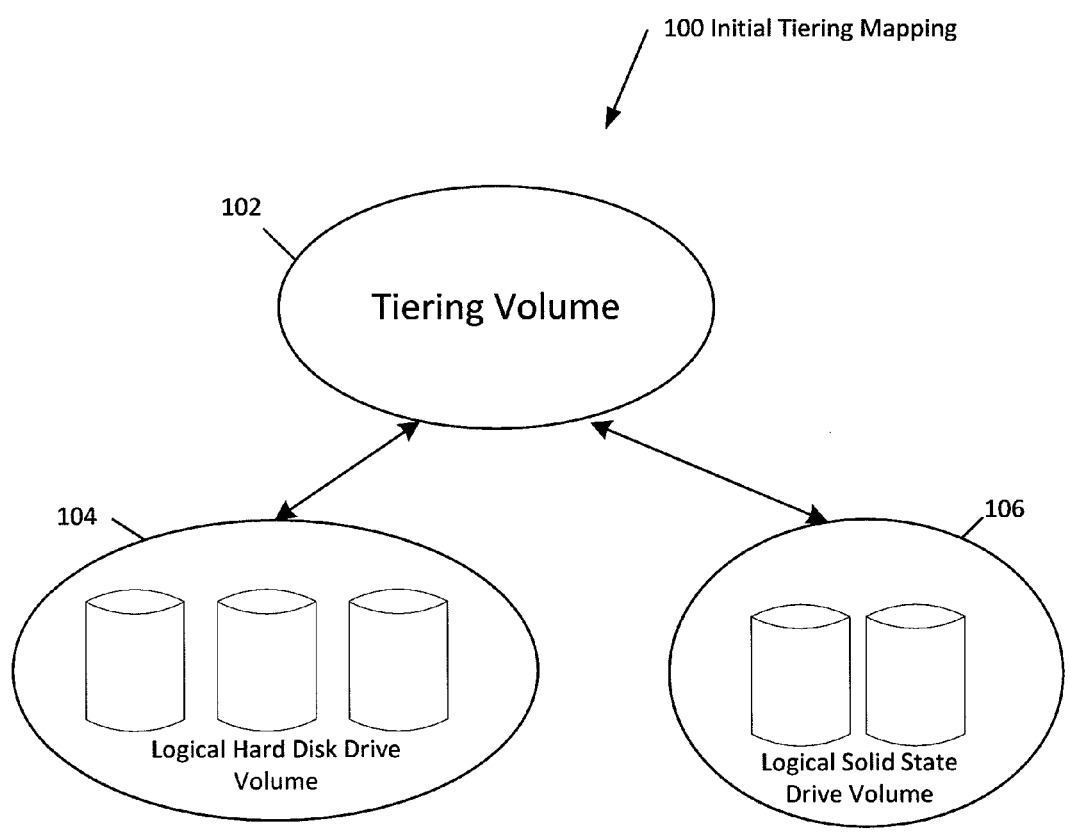
FIG. 1 is a schematic diagram illustrating initial tiering mapping structure.

FIG. 1 is a schematic diagram illustrating an initial mapping structure embodiment of a tiered volume for a data storage device. A tiered volume 102 is a plurality of physical volumes combined to appear as one logical volume to the user. Tiered volumes can be made up of many hard disk drives, a combination of hard disk drives and solid state drives, or made up entirely of solid state drives. A primary difference between tiering and caching is that tiering exposes the fast storage area to an outside user, thus allowing the entire storage volume to be accessible for data storage and retrieval. In tiering, the fast and slow data storage areas are combined into one logical volume. The data migration process between fast and slow layers of this volume usually occurs automatically, based upon frequency of use and time without access parameters. Using solid state drives exclusively is cost prohibitive for most applications. A tiered volume of mostly hard disk drives and either one or a small number of solid state drives is often a beneficial configuration for a performance/price balance. In order to determine where given data resides the entire tiered volume is typically mapped. Since the volumes can be quite large, many terabytes in most cases, the mapping of the entire tiered volume may utilize a very large amount of Dynamic Random Access Memory (DRAM). The very large DRAM usage for mapping of the entire tiered volume may limit the overall size of the tiered volume. Since the fast storage area is much more expensive, the ratio of slow to fast storage tends to be around 10 to 1. This ratio causes about 90% of the mapping memory to be used to map the slow storage devices. A solution to these high memory demands may be to provide an area of fast storage and slow storage within a system using a reduced amount of DRAM by mapping in DRAM only the headers of the fast storage regions and not the slow storage regions of the overall tiered volume. Since only the fast storage (typically placed at the beginning of the overall tiered volume) is being mapped in DRAM, less DRAM is necessary when compared to mapping the entire tiered volume.

As depicted in FIG. 1, tiering volume 102 includes, or is operatively coupled to, a logical hard disk drive volume 104 and logical solid state drive volume 106 to appear as one logical or virtual tiered volume to the end user. The solid state drive volume 106, as an example, may contain one gigabyte of storage, while the hard disk drive may contain over thirty gigabytes of storage.

Logical hard disk drive volume 104 and logical solid state drive volume 106 may include dynamic random access memory or hereafter referred to as DRAM, which is used to increase overall system performance with a minimum amount of DRAM usage being a preferred configuration. In a typical system, data is categorized as either "hot" or "cold". The term hot, as used herein, refers to data on a storage device that is accessed frequently, or has been recently accessed. The term cold, as used herein, refers to data on a storage device that is accessed infrequently, or has not been recently accessed. Each of the logical volumes 104 and 106 are capable of providing stored data to the user at any point. However, data from the hard disk drive volume 104 will require more time to access. Additionally, either logical volume is available for data storage after a determination on whether the data is hot or cold. Mapping of the hot data to the fast storage device is typically performed at the beginning of the volume. This mapping of data to the beginning of the volume allows faster access time and reduces the amount of DRAM needed.

Figure 2:
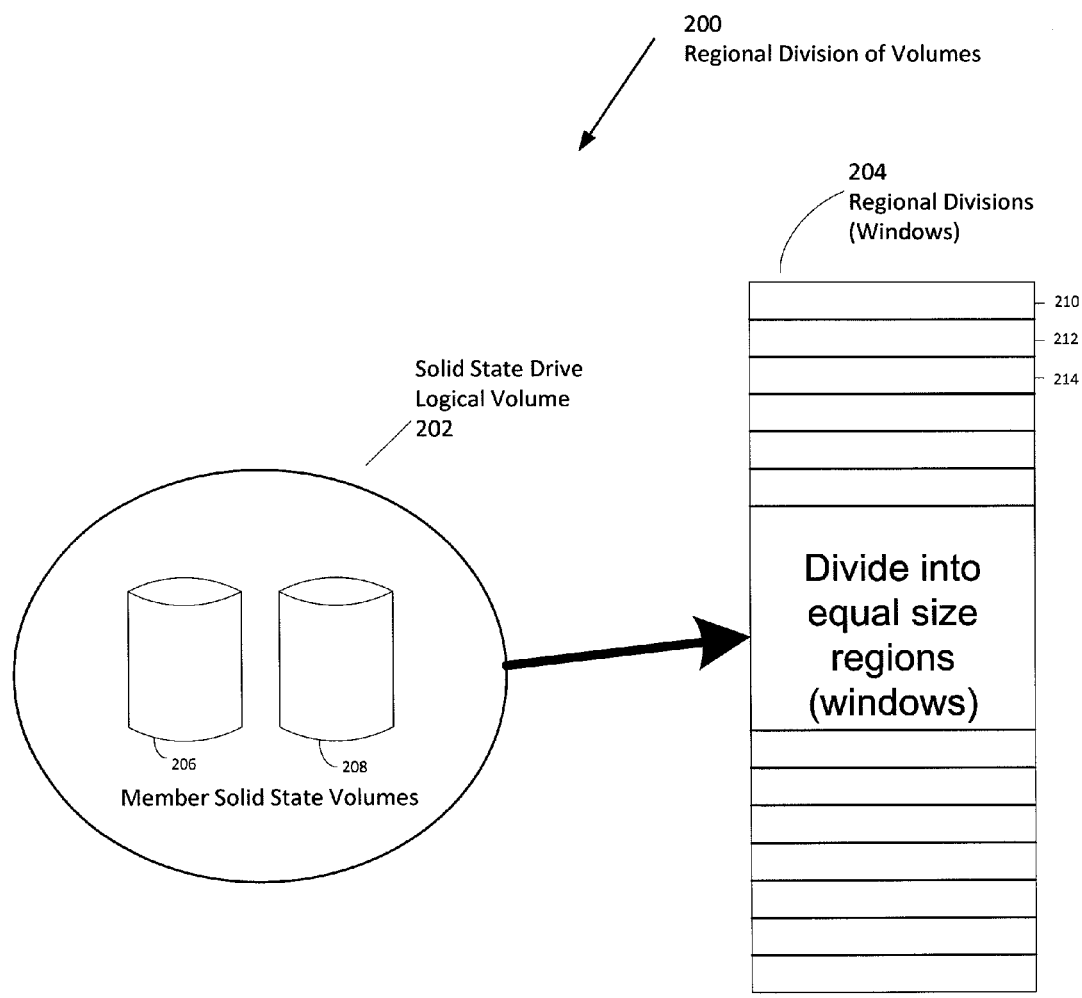
FIG. 2 is a block diagram illustrating logical block address windowing.

FIG. 2 is a schematic diagram depicting the regional division 200 of the solid state logical volume 202. As shown in FIG. 2, a plurality of solid state drives 206, 208 can be combined into one solid state drive logical volume 202. For example, assuming the solid state drive logical volume 202 is a one terabyte, then the volume could be divided into 1,000,000 equal size regional divisions 204 or windows of one megabyte each. These regional divisions 204 or windows may be divided into any size region that suits the end use of the drive. Each window will have a starting global logical block address for the overall logical volume 202, as well as global logical block addresses within the solid state drives 206, 208. Each of the windows 204 can be 32 bit values, as windows will start on large megabyte offset. The region size is typically determined when the drive is divided, and is based upon the size of the regional division 204 that will typically be used on a continual basis. The size of the regional division 204 is application specific, and should be tailored for optimal performance by an end user.

Logical block addressing or LBA, as used herein, refers to a common methodology for specifying the location of blocks of data stored on data storage devices. LBA is a linear addressing method, where blocks of data are located by an integer index with the first block being LBA 0, then LBA 1, and so on. For each of the regional divisions 204, a corresponding header tracks volume mapping. The header may contain such features as an identification of the member logical volume of the section, identification of the member logical volume being mapped, starting LBA of the regional division 204 for the hard disk drive, starting LBA of the solid state drives 206, 208, various flags to support the input/output stream, or the like. Multiple hard drives and multiple solid state drives will typically be mapped together. However, the mapping need not be an equivalent mapping. The mapping of the logical hard disk drive volume 104 (FIG. 1) and the logical solid state drive volume 106 coalesce into one tiered virtual drive 102, so that the LBA tracks the location of data.

Using the one megabyte window example, mapping occurs on the one megabyte boundary, since it represents one megabyte of continuous space. The regional divisions 204 represent one megabyte of continuous space starting in the logical boundary. For example, starting at LBA 0 for a solid state disk, the second window starts at the LBA, which represents one megabyte which is "2048", and the next window will be "4096", and so forth. The mapping between hot area LBA and cold area LBA is mapped one-to-one. When data changes from a hot region to a cold region, the data is moved in the one megabyte region from the solid state drive volume 106 to the hard disk drive volume 104 in a one-to-one swap. When data changes from a cold region to a hot region, the data is moved in the 1 megabyte region from the hard disk drive volume 104 to the solid state drive volume 106 in a one-to-one swap. This requires assigning headers only for data in the solid state drive portion of the virtual drive reducing DRAM requirements. For example, if data is swapped from a window at LBA "2048" on the solid state drive to a window at LBA "128,000" on the hard disk drive, the data that originated at LBA "2048" will now reside at LBA "128,000", and the data that resided at LBA "128,000" will now reside at LBA "2048", the data is not duplicated. Swapping data on a one-to-one basis provides for quicker data transfer, not duplication of data, and less DRAM usage for mapping of the hot area.

If there is corruption of data during a move operation, there will be a loss of data. A copy, move, delete operation allows preservation of data by providing an opportunity for the system to verify data integrity before deleting the data. A move operation does not provide the same security. However, a move operation is considerably quicker to execute and thus improves system performance.

As data comes into the tiered storage volume 102 as a write, the address for the data is identified and compared with the hot mapped regions or windows. The LBA is then read and, if the address is identified as hot, the data is directed to the solid state drive volume 106 instead of the hard disk drive volume 104. The LBA lookup is performed as a hashing function. In a typical hashing function, hash buckets are created for a certain region that is a hash on the LBA size that points to the index that represents a particular LBA, and that is then hashed as a part of the overall tiered volume 100. One example of hashing would be to create hash buckets from 128K to 256K in size. Each bucket is only 4 bytes and is a pointer to a window.

Following the example, the tiered volume ranges from 0 to 31 terabytes and, if a data write comes in at LBA 128,000, the data gets hashed to see if a window is identified for that data set. If a window exists, the data is written to the solid state drive volume 106. If no window exists, the data is written to a LBA on the hard disk drive volume 104. Windows only need to exist for the hot areas. If no window exists, the data is passed to the hard disk drive volume 104 for storage.

Figure 3:
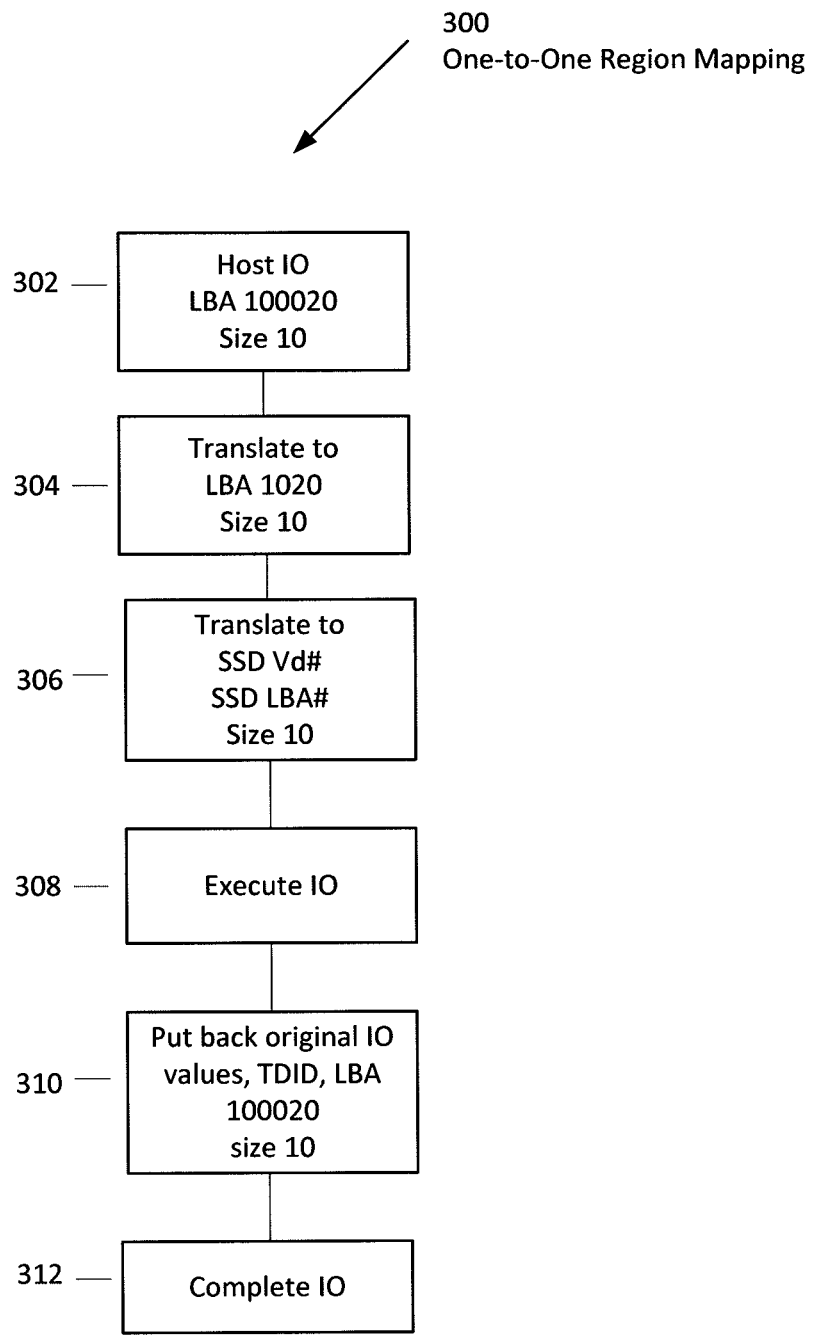
FIG. 3 is a block diagram illustrating input-output translation.

FIG. 3 is a flow diagram illustrating the one-to-one region mapping between solid state drive and hard disk drive. As shown in FIG. 3, data set starts at LBA 100020 with a size of 10, as shown at step 302. LBA 100020 is translated to LBA 1020 at step 304, while maintaining window size of 10. At step 306, data is translated to solid state drive per solid state drive number as established as the address was hashed with the corresponding logical block address, while maintaining a data block size of 10. Solid state drive receives the write request from the hard disk drive and the data is appropriately moved. Input/output write is executed at step 308, and original input/output values, and tiering drive identifications are reset back to original values at step 310. Input output write is completed at step 312.

Figure 4:
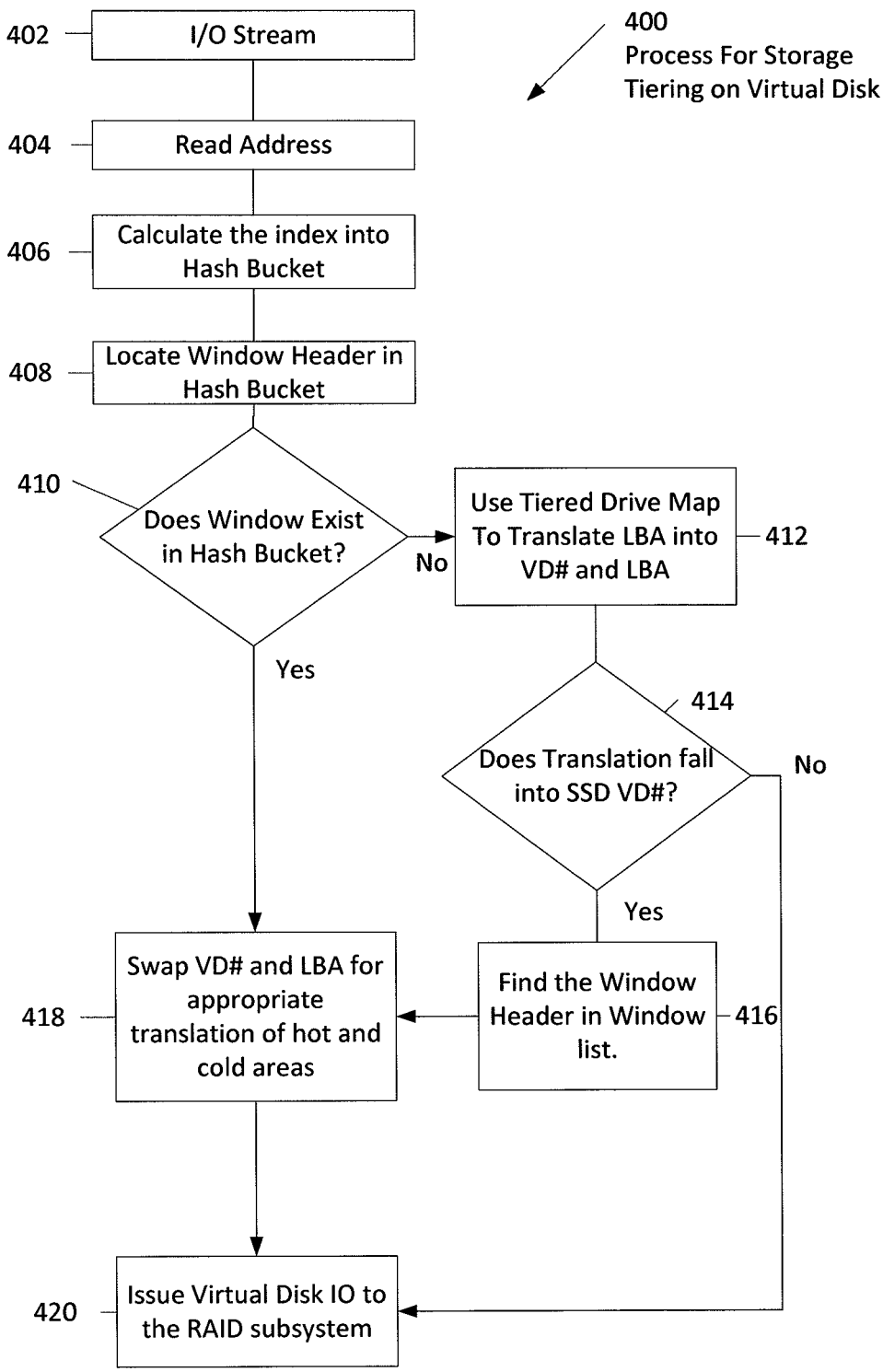
FIG. 4 is a flow diagram of a process for storage tiering on a virtual disk.

FIG. 4 is a flowchart of a process for storage tiering on a virtual disk storage system. The steps illustrated in FIG. 4 may be performed by one or more elements of tiering volume 100. For example, input/output data stream 402 enters the tiered volume, and the I/O data stream address is read at step 404, where the data stream is indexed and hashed at step 406. Once the address is hashed, the window header is located in the hash bucket at 408. If a window exists in the hash bucket for the LBA at step 410, the process continues to 418, where the virtual drive address is changed and new LBA is assigned for appropriate translation of hot and cold areas. Optionally, if no window exists, the process continues to step 412 where the tiered drive map is used to translate the LBA and virtual drive address. If the translation falls into the solid state drive volume, the window header in the window list is located and the process proceeds to step 418. If the translation does not fall into the solid state drive volume, the data is issued to the virtual disk I/O to the RAID subsystem at step 420.

Figure 5:
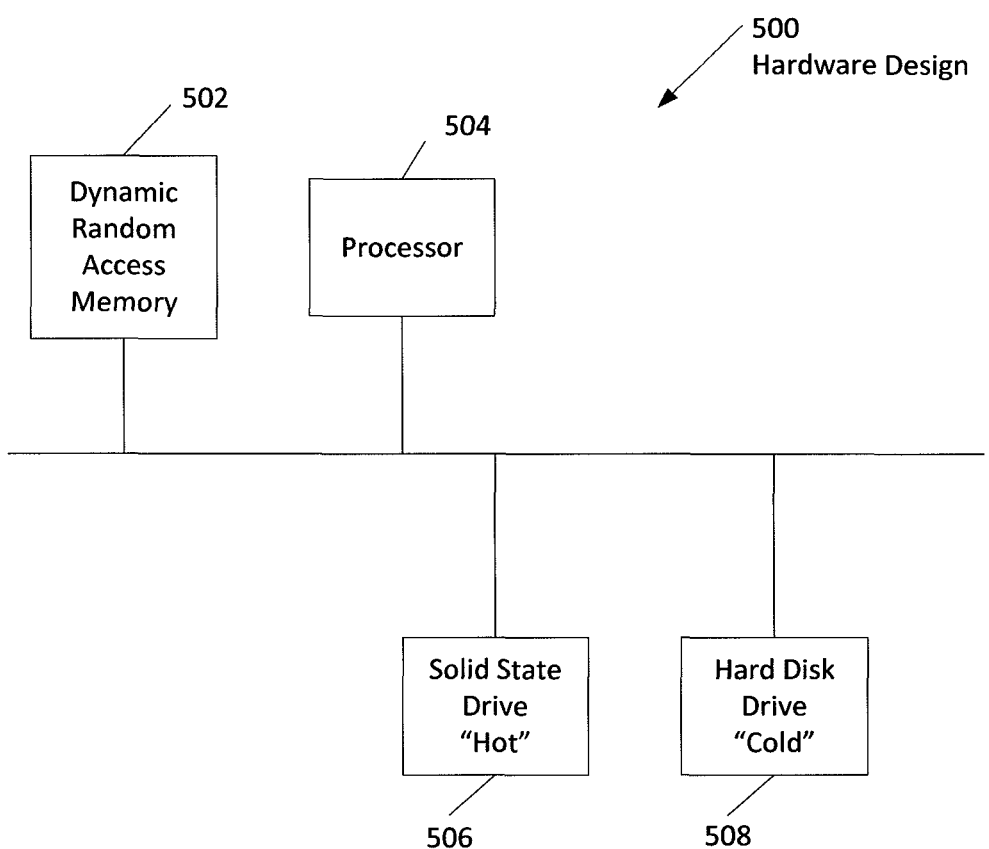
FIG. 5 is one embodiment of a hardware diagram for carrying out aspects of the current invention.

FIG. 5 is a schematic illustration of a hardware diagram 500. The hardware diagram 500 includes dynamic random access memory 502 that stores logical block addressing information. The diagram further includes a processor 504 that interconnects the dynamic random access memory 502 with solid state drive 506 and hard disk drive 508. The hardware design 500 is established to allow solid state drive 506 and hard disk drive 508 to read, write, move and delete data across drives in the manner described above.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storage tiering with reduced use of Dynamic Random Access Memory (DRAM) for header overhead in mapping structure of said DRAM comprising:
   tiering a plurality of data storage devices into fast storage regions and slow storage regions such that data is not duplicated between said fast storage regions and said slow storage regions;
   mapping Logical Block Addresses (LBAs) of said fast storage regions and said slow storage regions into one tiered virtual drive such that said LBAs track the location of data within said one tiered virtual drive;
   assigning headers only for data in said fast storage regions and not for data in said slow storage regions;
   mapping in said DRAM only headers for data in said fast storage regions;
   moving cold data to said slow storage regions and hot data to said fast storage regions on a one-to-one basis such that infrequently accessed cold data in said fast storage region is moved to said slow storage regions and frequently accessed hot data in said slow storage regions is moved to said fast storage regions; and
   swapping LBAs of said hot data and said cold data of said one-to-one basis move in said header of said hot data in said fast storage region.

2. The method of claim 1 further comprising:
   receiving Input/Output (IO) instructions for said hot data or said cold data;
   translating header of said hot data for said one-to-one swap of LBAs of said hot data and said cold data; and
   executing said IO instructions in accord with said swapped LBAs of said hot data and said cold data.

3. The method of claim 2 further comprising looking up LBA information of said IO instructions in said map in said DRAM using a hash function.

4. The method of claim 1 wherein said process of mapping said LBAs of said fast storage regions and said slow storage regions into one tiered virtual drive is further mapped such that said fast storage regions are positioned at a beginning portion of said LBAs of said one tiered virtual drive.

5. A method of minimizing the use of Dynamic Random Access Memory (DRAM) that is used in a header overhead mapping structure of a tiered drive storage system in order to provide Logical Block Addresses (LBAs) for frequently accessed data comprising:
   dividing a solid state logical volume into equal divisions, said solid state logical volume being part of a fast storage region in comparison to slow storage regions on hard disk drive storage volumes such that data is not duplicated between said fast storage region and said slow storage regions;
   mapping overall LBAs of said fast storage region and said slow storage regions into one tiered virtual drive such that said overall LBAs track the location of data within said one tiered virtual drive;
   assigning header tracks for mapping said LBAs for said frequently accessed data such that only data on said fast storage region, including data on said solid state logical volume, has said header tracks and data on slow storage regions do not have header tracks;
   mapping in said DRAM only header tracks for data in said fast storage region;
   moving and storing said frequently accessed data as hot data in said fast storage region;
   moving and storing said infrequently accessed data as cold data in said slow storage regions;
   swapping equal divisions of said frequently accessed hot data with said infrequently accessed cold data in a one-to-one exchange, based on a determination that said frequently accessed hot data becomes infrequently accessed cold data; and
   assigning to said header tracks an identification of a member logical volume, starting logical block address of said equal divisions for said fast storage region, starting logical block address of said equal divisions for said slow storage regions, based upon a determination of LBAs of said swapped divisions.

6. The method of claim 5 wherein said process of mapping said overall LBAs of said fast storage region and said slow storage regions into one tiered virtual drive is further mapped such that said fast storage region is positioned at a beginning portion of said LBAs of said one tiered virtual drive.

7. The method of claim 6 further comprising:
receiving Input/Output (IO) instructions for said hot data or said cold data;
looking up LBA information of said IO instruction in said map in said DRAM using a hash function;
translating a header track of said hot data for said one-to-one swap of LBAs of said hot data and said cold data; and
directing as part of execution of said IO instructions said frequently accessed hot data to said fast data storage regions.

8. A system of tiered storage devices comprising:
solid state drives that comprise fast storage regions;
hard disk drives that comprise slow storage regions;
dynamic random access memory for storing a map of said header tracks of data stored on said fast storage regions; and
a processor that:
  divides said fast storage regions into equal divisions;
  divides said slow storage regions into equal divisions;
  maps overall Logical Block Addresses (LBAs) of said fast storage regions and said slow storage regions into one tiered virtual drive such that said overall LBAs track the location of data within said one tiered virtual drive and such that data is not duplicated between said fast storage regions and said slow storage regions;
  assign header tracks only for data in said fast storage regions and not for data in said slow storage regions;
  maps in said DRAM only header tracks for data in said fast storage regions;
  moves and stores frequently accessed data as hot data in said fast storage region;
  moves and stores said infrequently accessed data as cold data in said slow storage regions;
  swaps equal divisions of said frequently accessed hot data with said infrequently accessed cold data in a one-to-one exchange, based on a determination that said frequently accessed hot data becomes infrequently accessed cold data;
  assigns to said header tracks of data in said fast storage region an identification of a member logical volume, starting logical block address of said equal divisions for said fast storage regions, starting logical block address of said equal divisions for said slow storage regions, based upon a determination of LBAs of said swapped divisions.

9. The system of claim 8 wherein wherein said processor further maps said overall LBAs of said fast storage region and said slow storage regions into one tiered virtual drive such that said fast storage regions are positioned at a beginning portion of said LBAs of said one tiered virtual drive.

10. The system of claim 8 wherein said processor further:
receives Input/Output (IO) instructions for said hot data or said cold data;
translates a header track of said hot data for said one-to-one swap of LBAs of said hot data and said cold data; and
directs as part of execution of said IO instructions said frequently accessed hot data to said fast data storage regions.

11. The system of claim 10 wherein said processor further looks up LBA information of said IO instructions in said map in said DRAM using a hash function.

* * * * *